United States Patent [19]
Ironside et al.

[11] 3,814,913
[45] June 4, 1974

[54] PROCESS CONTROL APPARATUS

[75] Inventors: John Michael Ironside, Birmingham; Duncan Barry Hodgson, Leamington Spa; Michael Murray Bertioli, Lichfield; Malcolm Williams, Solihull, all of England

[73] Assignee: Joseph Lucas (Electrical) Limited, Birmingham, England

[22] Filed: Dec. 13, 1972

[21] Appl. No.: 314,786

[30] Foreign Application Priority Data
Dec. 21, 1971 Great Britain.................. 59506/71

[52] U.S. Cl............................ 235/151.1, 235/92 CT
[51] Int. Cl............................................. G06f 15/46
[58] Field of Search .... 235/197, 151.1, 151, 92 CP, 235/92 CT; 340/166 R

[56] References Cited
UNITED STATES PATENTS
3,548,169 12/1970 Togneri........................ 235/151.1 X
3,578,960 5/1971 Georgi et al..................... 235/92 CP
3,621,228 11/1971 Paine et al......................... 235/197
3,681,581 8/1972 Paine et al....................... 235/151.1

Primary Examiner—Joseph F. Ruggiero

[57] ABSTRACT

"PROCESS CONTROL APPARATUS" includes two transducers for measuring two parameters of the process, and a memory unit to which the outputs from the transducers are fed. The memory unit produces an output dependent on the values of the two parameters, this output being binary, and being coupled to a counter which also receives clock pulses. The counter samples the memory unit output, and produces an output pulse when the clock pulse reading is equal to the sample reading. The output pulses are then used to control the process.

9 Claims, 3 Drawing Figures

PROCESS CONTROL APPARATUS

This invention relates to process control apparatus.

The invention resides in process control apparatus in which the process is controlled by an input pulse the duration of which governs the progress of the process, and is to be determined by the values of at least two parameters associated with the process, comprising in combination first and second transducers for measuring the two parameters, a memory unit to which the outputs from the transducers are fed, the memory unit producing a binary output dependent on the values of the two parameters, a counter connected to a source of clock pulses, means whereby the counter samples the memory unit output, then produces an output pulse when a number of clock pulses have been received equal to the sample reading obtained from the memory unit, each output pulse causing the counter to resample the memory unit output after which the cycle re-commences, so that the counter produces a succession of output pulses, the time between any two successive output pulses being dependent on the last memory unit output sampled by the counter, means for initiating each input pulse required by the process, and means controlled by the output pulses from the counter for terminating each input pulse to the process.

Figure 1:
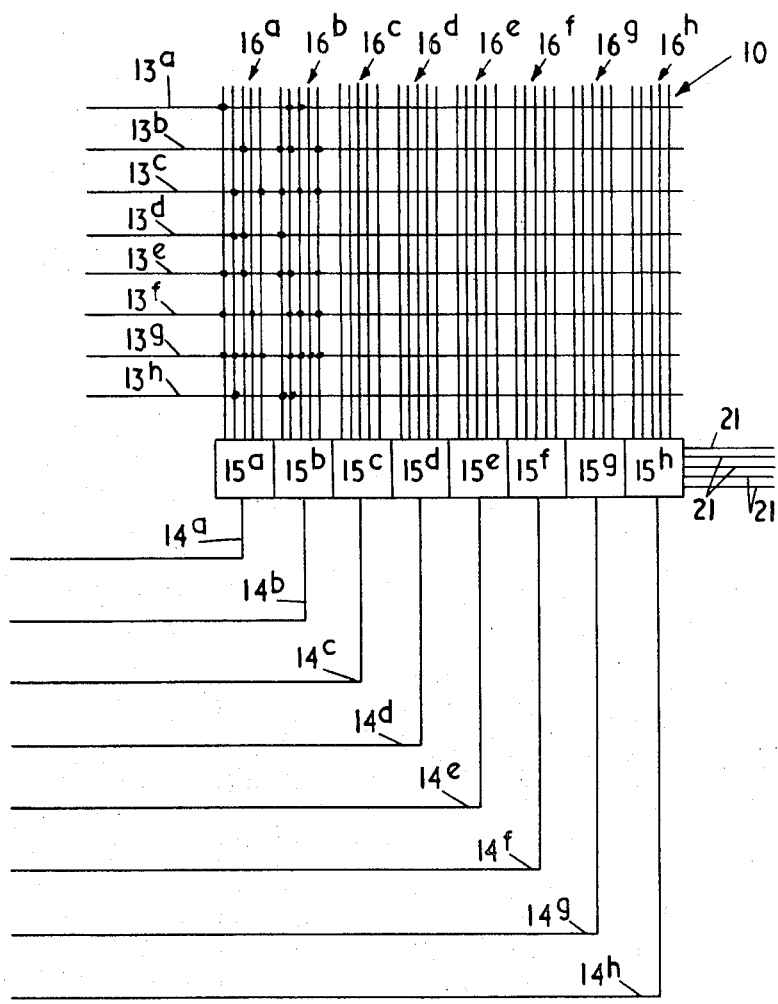
Figure 2:
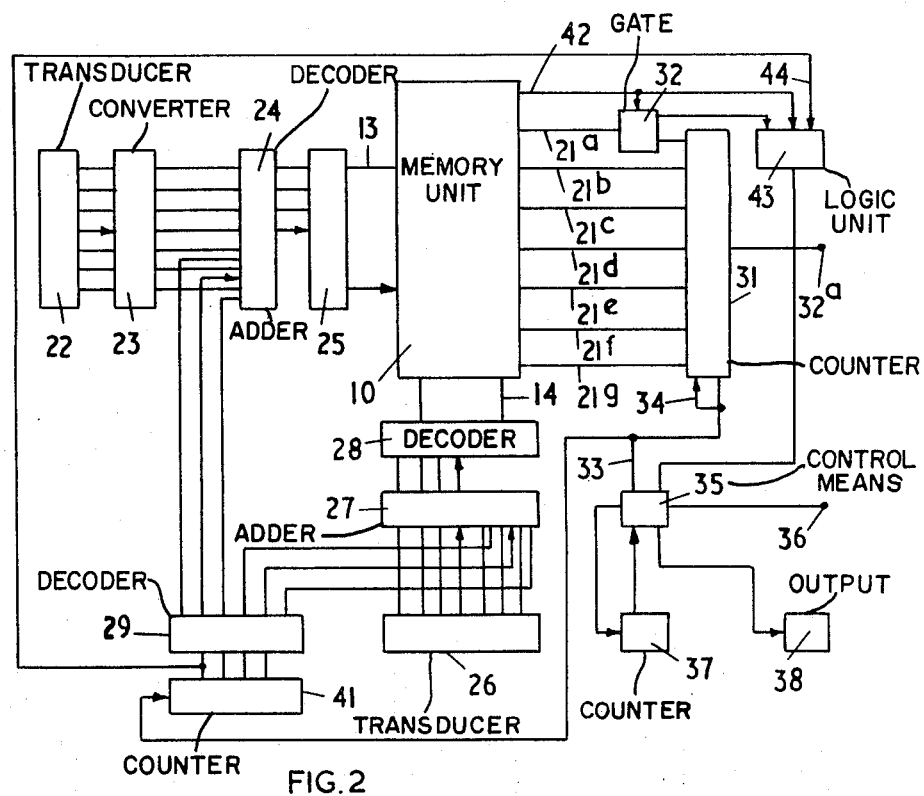
Figure 3:
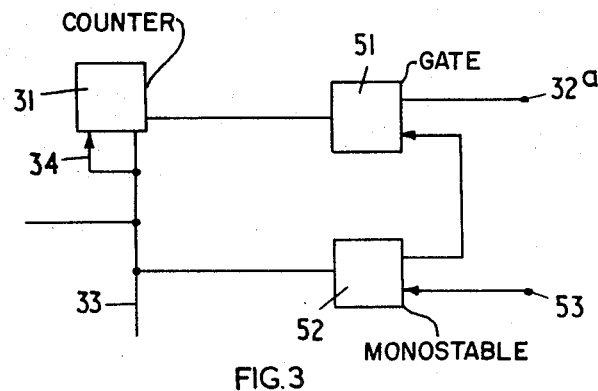

In the accompanying drawings,

FIG. 1 is a circuit diagram of a matrix which can be employed in the invention, and FIG. 2 is a circuit diagram illustrating one example of the invention, and FIG. 3 is a fragmentary view showing a modification of FIG. 2.

In the drawings, a process to be controlled requires an input in the form of a pulse the duration of which determines the progress of the process, and is to be governed by the values of first and second parameters associated with the process. Although a number of different memory units can be employed in accordance with the invention, the diode matrix shown in FIG. 1 is a convenient form of memory unit for this purpose.

Referring to FIG. 1, an electrical signal is produced representing the first process parameter. Depending on the value of this signal, one of eight input lines 13a to 13h of the memory unit 10 is energised. The memory unit 10 further includes eight sets of input lines 16a to 16h, each of the lines 13a to 13h crossing each of the sets of lines 16a to 16h. Although in the example shown there are eight input lines 13 and eight sets of lines 16, it will be appreciated that the number of lines can be more or less than this figure. Moreover, although in the example shown each set of lines 16 contains five lines, there can be more or less lines in each set 16.

A second signal is produced respresenting the second process parameter, and depending on the value of the parameter one of the lines 14a to 14h is energised. The lines 14a to 14h are connected to a switching device 15 having eight sets of switches 15a to 15h respectively. The arrangement is such that when a signal appears on the line 14a, the switches 15a connect the lines 16a to five output lines 21 coupled to means for controlling the length of the output pulse used to control the process.

The lines 16 and 13 are interconnected by diodes in an empirically determined manner depending on the process being controlled. In FIG. 1, the connections between the first two sets of lines 16a, 16b and the lines 13 are shown, each dot representing a diode connection. Suppose that the value of the parameter controlling the lines 13 is such that the line 13a is energised, and the value of the parameter controlling the lines 14 is such that the line 14a is energised, then the switches 15a connect the lines 16a to the output lines 21, which will carry a signal of the form 10,000, where 1 represents the diode connection between the line 13a and the first set of lines 16a and the four 0's indicate the lack of connection between the line 13a and the remaining set of four lines 16a. If the parameters now change in such a manner that the line 13g and the line 14b are energised, then the output lines 21 will receive a signal 01111 since as seen in the drawing, the line 13g is not connected to the first set of the lines 16b, but is connected to the remaining set of four of the lines 16b. Thus, it will be appreciated that the memory unit 10 produces an output dependent on the two input signals received by the lines 13 and 14, and controls the output pulse length in accordance with the pre-set connections within the memory unit 10.

Referring now to FIG. 2, the memory unit 10 is of the general form shown in FIG. 1, but it has 16 lines 13 and 16 lines 14, and each set of lines 16 contains seven lines so that there are seven output lines 21a to 21g.

In this example, a transducer 22 is provided for measuring the first process parameter, the transducer 22 producing an output in the form of a seven bit word in Gray binary code. This signal is fed to a converter 23 which converts the Gray binary signal to a straight binary signal, and passes this signal on to a seven bit adder 24. The four most significant digits in the adder 24 are passed to a decoder 25, which addresses one of the lines 13. Another transducer 26 produces a seven bit straight binary output representing the second parameter, and this signal is fed to a seven bit adder 27, the four most significant digits of which are fed to a decoder 28 which addresses one of the lines 14. The memory unit 10 then produces an output on the lines 21a to 21g, this output having a value determined by the values of the two parameters. It will be noted that the adders 24 and 27 are connected to a decoder 29, the purpose of which will be described later.

The output on the lines 21a to 21g is passed to a counter 31, a gate 32 being provided between the memory unit 10 and the counter 31 on the line 21a. For the moment this gate 32 can be ignored, and it can be assumed that the line 21a is connected to the counter 31. When the counter 31 receives an initiating signal, it is connected to the lines 21a to 21g, and so assumes a reading dependent on the reading on the lines 21a to 21g. The counter 31 is then disconnected from the lines 21a to 21g. A terminal 32a is connected to the counter 31, and is provided with clock pulses of fixed frequency, and a count is made of the signal stored in the counter 31. At the completion of the count, the counter 31 produces an output which is passed to a line 33, which serves by way of the line 34 to re-initiate the counter 31, so that the counter 31 again samples the signal on the lines 21a to 21g. The count then re-commences, and so it will be seen that the counter 31 automatically samples the signals on the lines 21a to 21g repeatedly, and produces output pulses to the line 33. It will be appreciated that the time interval between these output pulses will depend on the signal on the lines 21a to 21g.

The output from the counter 31 is also fed to a counter 41 controlling the decoder 29. The decoder 29 is connected to the adders 24 and 27, and the contents of the decoder 29 are added to the least significant digits passed into the adders 24 and 27. Assuming that the two parameters are constant, then the counter 31 will receive a signal representing these constant parameters, and produce a pulse which is fed through the line 33. At the same time, a pulse is fed to a divide by 16 counter 41 the reading of which it will be considered to be initially zero, the output from the counter 41 is fed to decoder 29 such that in the particular example the binary equivalent of 1 is then added in the adder 24 and the binary equivalent of 5 is added to the adder 27 and may, depending on the readings in the adders 24 and 27, cause one of the four most significant digits passed to the decoders 25 and 28 to change, either of which could cause the output of the memory unit 10 to change. The output from the memory unit 10 is then sampled and a pulse is fed to the counter 41, at which point the decoder 29 adds the binary equivalent of 2 into the adder 24 and the binary number 6 into the adder 27. This procedure continues for the 16 pulses required to define the 16 states of the counter 41, the seventeenth pulse re-commencing the cycle, the adders 24 and 27 having added into them the binary equivalents according to the table given below so that for fixed values of the parameters, 16 discrete readings from each of the adders 24 and 27 result, each of the 16 discrete readings having for its four most significant digits, one of two adjacent values.

24 1 2 3 4 5 6 7 8 8 7 6 5 4 3 2 1 1 2
27 5 6 7 8 8 7 6 5 4 3 2 1 1 2 3 4 5 6

In this manner 16 discrete readings are produced in the output from the memory unit 10, each reading having one of up to four values determined by the four most significant bits from the adders 24 and 27.

When an input signal from the counter 31 is received by the line 33 it passes to a control means 35 which also receives a signal from a logic unit 43, the function of which will be described later. The control means 35 is also connected to a terminal 36 which receives a signal when an output pulse is to commence. Any convenient known means can be used to provide the signal to the terminal 36. The control means 35 plays no part in the operation until a signal is received at the terminal 36, but assuming that a signal has been received at the terminal 36, then the next time the line 33 provides an input to the control means 35, the control means 35 operates means 38 which initiates an output pulse.

It will be seen that after a signal is received at the terminal 36, the output pulse commences on receipt of the next pulse from the line 33, which of course will be the next pulse from the counter 31. The control means 35 now allows further pulses from line 33 to pass to a counter 37, the arrangement being such that the output pulse terminates only when 16 pulses have been received by the counter 37 from the control means 35, so that the output pulse starts on the first pulse from line 33, and terminates on the seventeenth pulse from line 33. In other words, the length of the output pulse will be the time taken for 17 pulses to be received from the counter 31, so that the output from the memory unit 10 will be sampled 16 times, to determine the length of the output pulse.

It will be appreciated that the synchronisation pulse from terminal 36 may occur at any time during the cycling of counter 41.

There may be certain parameter values which do not require any output pulse and in the example shown the memory unit 10 has an additional output line 42 which is energised when such conditions are approached. The line 42 then closes the gate 32 so that the most significant line 21a of the output from the memory unit 10 is disconnected from the counter 31, and is connected to the logic unit 43 together with the line 42. A further line 44 is taken from the output of the counter 41 to the logic unit 43 and is energised at one particular state of the counter 41. The operation of the logic unit 43 is such that a signal is produced at its output when all three inputs are energised, the signal remianing until the signal on line 42 is removed with the signal on line 44 present. The output signal from the logic unit 43 is present when no output pulse is required, and this signal is fed to the control means 35, so that when the counter 37 completes its sequence of 16 counts, further pulses on line 36 do not initiate further operations of the control means 35 and the counter 37. In this way any output pulse which has commenced is allowed to be completed. When the output from the logic unit 43 is removed, the next pulse to occur on the line 36 re-commences the sequence. An alternative connection for zero length output pulse is to take the output from logic unit 43 directly to the means 38.

The example described has two important features, and whilst it is preferable for these features to be employed in conjunction, they can be employed separately with advantage. One important feature is the way in which the output from the memory unit 10 is sampled. The other important feature is the way in which the decoder 29 is employed so that for given values of the parameters an alteration is made to the readings of the adders 24 and 27.

Referring to the modification shown in FIG. 3, the terminal 32a is connected to the counter 31 through a gate 51 which receives an input signal from a monostable circuit 52 connected to the line 33 and to a terminal 53. The terminal 53 is connected to means providing a signal representing a third parameter of the control process, and the arrangement is such that when the third parameter is present, the monostable circuit 52 produces an output which interrupts the signal from the terminal 32a to the counter 31 for a predetermined period of time. The period of the interruption is initiated by the appearance of a signal on the line 33, which is also connected to the monostable circuit 52.

Further control can be exerted on the counters 35 and 37 if either of the first or second input control parameters reaches a selected value by causing a further signal to be applied to the output of the logic unit 43.

We claim:

1. Process control apparatus in which the process is controlled by an input pulse the duration of which governs the progress of the process, and is to be determined by the values of at least two parameters associated with the process, comprising in combination first and second transducers for measuring the two parameters, a memory unit to which the outputs from the transducers are fed, the memory unit producing a binary output dependent on the values of the two parameters, a counter connected to a source of clock pulses, means whereby the counter samples the memory unit output, then produces an output pulse when a number of clock pulses have been received equal to the sample reading obtained from the memory unit, each output pulse causing the counter to re-sample the memory unit output after which the cycle re-commences, so that the counter produces a succession of output pulses, the time between any two successive output pulses being dependent on the last memory unit output sampled by the counter, means for initiating each input pulse required by the process, and means controlled by the output pulses from the counter for terminating each input pulse to the process.

2. Apparatus as claimed in claim 1 including means responsive to a third process parameter for modifying the time between successive clock pulses fed to the counter.

3. Apparatus as claimed in claim 2 in which the frequency of the clock pulses is proportional to the value of the third process parameter.

4. Apparatus as claimed in claim 2 in which there are trains of clock pulses with a delay between trains, the delay being dependent on the value of the third process parameter.

5. Apparatus as claimed in claim 1 including a logic network sensitive to parameters of the process for preventing production of input pulses to the process in certain circumstances.

6. Apparatus as claimed in claim 5 in which the logic network always permits an input pulse to the process to be completed once it has started.

7. Apparatus as claimed in claim 1 in which the means for initiating each input pulse required by the process includes a pulse source producing a control pulse when an input pulse is required, and logic means whereby following a control pulse, the next output pulse from the counter initiates the input pulse to the process.

8. Apparatus as claimed in claim 7 in which the input pulse to the process is terminated upon production of the $n$th pulse from the counter, where $n$ is greater than 2.

9. Apparatus as claimed in claim 8 in which the transducers produce binary signals and each time the counter produces an output, the binary signals have combined therewith different incremental signals to improve the accuracy with which the apparatus computes the required length of the process input pulse for given values of the two parameters.

* * * * *